US011346702B2

(12) United States Patent
Hashemian

(10) Patent No.: US 11,346,702 B2
(45) Date of Patent: May 31, 2022

(54) METHODS AND APPARATUS FOR CALIBRATION AND RESPONSE TIME TESTING OF LEVEL SENSORS

(71) Applicant: ANALYSIS AND MEASUREMENT SERVICES CORPORATION, Knoxville, TN (US)

(72) Inventor: Alexander Hashem Hashemian, Knoxville, TN (US)

(73) Assignee: Analysis and Measurement Services Corporation, Knoxville, TN (US)

( * ) Notice: Subject to any disclaimer, the term of this patent is extended or adjusted under 35 U.S.C. 154(b) by 21 days.

(21) Appl. No.: 16/911,054

(22) Filed: Jun. 24, 2020

(65) Prior Publication Data
US 2020/0400485 A1    Dec. 24, 2020

Related U.S. Application Data

(60) Provisional application No. 62/865,685, filed on Jun. 24, 2019.

(51) Int. Cl.
*G01F 25/20*     (2022.01)
*G01F 23/16*     (2006.01)

(52) U.S. Cl.
CPC .............. *G01F 25/20* (2022.01); *G01F 23/16* (2013.01); *Y02E 30/30* (2013.01)

(58) Field of Classification Search
CPC ....... G01F 25/0061; G01F 23/16; Y02E 30/30
See application file for complete search history.

(56) References Cited

U.S. PATENT DOCUMENTS

| | | | |
|---|---|---|---|
| 2003/0216879 A1* | 11/2003 | Hashemian | G01D 3/08 702/95 |
| 2005/0024259 A1* | 2/2005 | Berry | G01S 7/34 342/124 |
| 2005/0182581 A1* | 8/2005 | Hashemian | G05B 23/0283 702/105 |
| 2010/0154534 A1* | 6/2010 | Hampton | G01F 23/265 73/304 C |
| 2011/0005312 A1* | 1/2011 | Hopper | G01F 23/30 73/313 |
| 2014/0260521 A1* | 9/2014 | McQueen | G01F 25/0061 73/1.73 |
| 2014/0326038 A1* | 11/2014 | Fauveau | G01F 25/0061 73/1.73 |
| 2017/0038242 A1* | 2/2017 | Huang | G01F 25/0061 |
| 2020/0182677 A1* | 6/2020 | Hashemian | G01F 23/185 |
| 2020/0400508 A1* | 12/2020 | Hashemian | G01F 25/0007 |
| 2020/0402679 A1* | 12/2020 | Hashemian | G21C 17/108 |

FOREIGN PATENT DOCUMENTS

| | | | | |
|---|---|---|---|---|
| GB | 2086056 A | * | 5/1982 | ........... G01F 23/263 |
| WO | WO-2019126841 A1 | * | 7/2019 | ........... G01F 23/265 |

* cited by examiner

*Primary Examiner* — Ryan D Walsh
(74) *Attorney, Agent, or Firm* — Pitts & Lake, P.C

(57) ABSTRACT

Systems and methods of diagnosing performance of a level sensor of a fluid test chamber, including a data acquisition and processing unit configured to receive output signals of one or more level sensors that are installed to a fluid chamber, the data acquisition and processing unit being configured to connect to the one or more level sensors to record and process the output signals to test operation of the one or more level sensors.

19 Claims, 5 Drawing Sheets

METHODS AND APPARATUS FOR CALIBRATION AND RESPONSE TIME TESTING OF LEVEL SENSORS

CROSS-REFERENCE TO RELATED APPLICATIONS

This application claims the benefit of U.S. Provisional Application No. 62/865,685 filed on Jun. 24, 2019, the disclosure of which is incorporated by reference herein in its entirety.

STATEMENT OF GOVERNMENT INTEREST

This invention was made with government support under contract number DE-SC0011859 awarded by the U.S. Department of Energy. The government has certain rights in the invention.

BACKGROUND

The methods and apparatus described herein relate to level sensors that may consist of an elongated guide rod or sensor probe installed in a process to measure fluid level and more specifically to the in-situ calibration and response time testing of level sensors.

For many industrial plant applications, fluid level is a critical process parameter used by control and safety systems to safely and efficiently operate the plant. In the nuclear power industry, level is commonly measured using differential pressure based systems. However, for some applications such as level measurement in integral small modular reactors (SMRs) for example, conventional differential pressure transmitters may be forgone in place of other level sensor technologies including guided wave radar (GWR) systems and thermal dispersion probes.

Periodic testing of level sensor static and dynamic performance is vital to the safe and efficient operation of a nuclear power plant. More specifically, the calibration and response time of the level sensors must be verified. In some cases, it may be possible to verify the calibration and/or response time of the level sensors in-situ while the plant is operating. This capability depends on many factors including plant process conditions, operating procedures, sensor accessibility, and safety concerns among others. In most cases, calibration and/or response time testing of the level sensors may take place during a refueling outage when the plant is shut down and other periodic surveillance and maintenance activities are being performed. However, removing the level sensor guide rod or thermal dispersion probe from its installation for periodic calibration and response time testing in a laboratory is time-consuming and impractical, especially in SMRs. Furthermore, it may be difficult to remove the level sensor assembly from its installation for testing in a remote laboratory facility based on the probe length, the surrounding plant architecture, shipping and handling constraints, and other challenges.

Fluid level sensors themselves are known and established technologies. GWR systems use time domain reflectometry (TDR) technology to measure fluid level by transmitting a high-frequency electromagnetic traveling wave down the length of a guide probe inserted into a process. When the wave encounters the surface of the fluid, a reflection travels back along the guide probe towards the GWR transmitter, and level is determined from the time delay between the transmitted signal and the received reflection. Thermal dispersion based level sensors operate on the principle of heat transfer between an electrically heated sensor probe and the surrounding process. The thermal dispersion sensor probe may include one or more resistance temperature detectors (RTDs) or coils of resistive electrical wire capable of sensing changes in the surrounding process over its entire length. One or more of these RTDs or resistive electrical wires may be Joule-heated, and the resulting heat generated within the probe is dissipated to the surrounding process. Changes in fluid level affect this heat transfer as well as the electrical properties of the sensing element which can be measured to determine level.

Although the operating principles of these technologies may differ, the level sensors consist of an elongated guide rod or sensor probe that are directly inserted into the process in order to measure fluid level and is therefore vulnerable to calibration and/or response time degradation over time, especially when installed in harsh industrial plant process environments. Some sensor systems may include electronics and/or software to enable self-diagnostics while the sensor is in service. However, these capabilities are generally very limited and cannot verify level sensor performance as facilitated by the present methods and apparatus described herein.

BRIEF SUMMARY

Example embodiments of the present general inventive concept facilitate the process of in-situ calibration verification and response time testing of sensors, for example sensors that include an elongated guide rod or thermal dispersion probe installed in a process to measure fluid level.

In some embodiments, the system includes a chamber within which a level sensor guide rod or probe may be installed. The chamber can include at least one upper penetration and one lower penetration to facilitate connection to equipment for sensor calibration and/or response time testing. The bottom of the chamber is typically open to allow the guide rod or sensor probe to directly interact with the process fluid during normal operation and enable continuous level measurement. The chamber may be installed externally to a tank or vessel coupled via one or more process connections, or the chamber may be installed within the tank or vessel as it might be installed for applications such as SMR level measurement.

BRIEF DESCRIPTION OF THE DRAWINGS

The above-mentioned features of the present invention will become more clearly understood from the following detailed description of the invention read together with the drawings in which.

DETAILED DESCRIPTION

Figure 1:
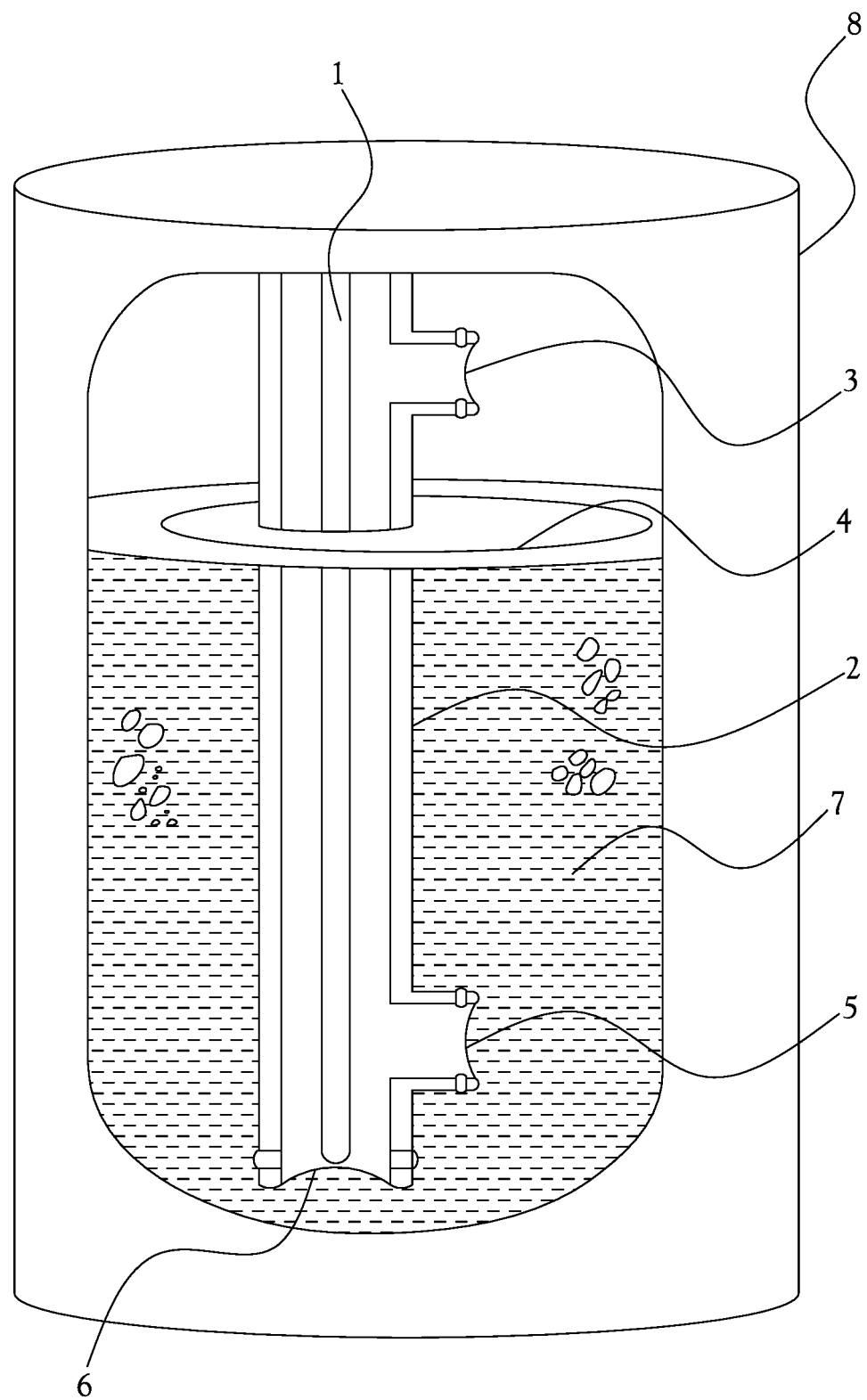
FIG. 1 is a simplified diagram of an assembly illustrating one possible configuration of the present invention that includes a sensor guide rod or probe installed within a chamber with an upper penetration above the fluid level, a lower penetration below the fluid level, and an open bottom to allow the sensor guide rod or probe to directly interact with the process fluid within a large vessel.

Example embodiments of the present general inventive concept describe systems and methods for in-situ calibration and response time testing of sensors, for example sensors that include an elongated guide rod or sensor probe installed in a process to measure fluid level.

In some embodiments, the system can include a chamber within which a level sensor guide rod or probe may be installed. The chamber typically includes at least one upper penetration and one lower penetration to facilitate connection to equipment for sensor calibration and/or response time testing. The bottom of the chamber can be open to allow the guide rod or sensor probe to directly interact with the process fluid during normal operation and enable continuous level measurement. During testing, the bottom of the chamber can be capped and level can be manipulated as necessary to perform in-situ sensor calibration verification and/or response time testing. The chamber may be made of metal or another durable material and may be constructed to a specified length and/or shape to accommodate complex installations and tank or vessel geometries. The chamber may be installed externally to a tank or vessel and coupled to the process fluid via one or more process connections. The chamber may also be installed within the tank or vessel as it might be installed for select nuclear power plant applications such as integral SMR level measurement. The chamber may be used as described herein to facilitate the in-situ testing of level sensor technologies such as GWR and thermal dispersion sensors among others without requiring the removal of the sensor assembly from its installation.

One possible configuration for in-situ level sensor calibration using the above-mentioned chamber can involve capping the bottom of the chamber and connecting a calibrated reference sensor such as a differential pressure sensor or sight gauge to the upper and lower penetration ports. Sensor output data may be collected at several levels from the level sensor under test and from the calibrated reference sensor in order to verify calibration and/or re-calibrate the level sensor under test if necessary.

In some embodiments, in-situ response time testing can be achieved by capping the bottom of the chamber, filling the chamber to some level, and connecting a random process noise generator to the lower penetration port to provide random air pressure pulses that rise to the surface and cause the fluid level to fluctuate thereby enabling in-situ response time testing via the noise analysis technique. The noise analysis technique can be based on monitoring the fluctuations that exists at the output of a sensor while it is measuring a dynamic process. In some cases, it is possible to collect noise data while the sensor under test is in service. However, if the sensor is installed in a stagnant process, the noise analysis technique may not be applicable while the sensor is in service, and the above-mentioned test chamber and random process noise generator may be used as described herein. Noise data can be sampled from the sensor under test at a fast rate by a data acquisition device and analyzed in the time and/or frequency domain by generating a power spectral density (PSD) of the data via a Fast Fourier Transform (FFT) algorithm and fitting a mathematical function to the PSD to yield parameters that are used to determined sensor response time. Autoregressive (AR) modeling, a time domain technique, may also be used in addition or in lieu of frequency domain analysis via FFT. The performance of this analysis may be facilitated by the use of specialized software packages. The noise analysis technique is often used for determining the dynamic performance of differential pressure transmitters and other sensor systems in nuclear power plants. The noise analysis technique has also been used for response time testing of GWR and thermal dispersion based level sensors by the inventor in a laboratory.

According to example embodiments of the present general inventive concept, in-situ response time testing can be achieved by capping the bottom of the chamber, fitting a fast-opening out to the chamber bottom, filling the chamber to some level, and connecting a fast-response reference sensor such as a differential pressure transmitter to the upper and lower penetration points to perform a level ramp response test. Sensor output data may be collected from the level sensor under test and the fast-response reference sensor as the valve (for example, as shown by reference number 13 in FIGS. 2-3) on the bottom of the chamber is suddenly opened and the level drops quickly. The response time for the level sensor under test can be determined from the ramp time delay between the sensor under test and the reference sensor.

FIG. 1 illustrates one possible configuration of the present invention that includes a sensor guide rod or probe 1 installed within a chamber 2 with an upper penetration 3 above the fluid level 4, a lower penetration 5 below the fluid level 4, and an open bottom 6 to allow the sensor guide rod or probe 1 to directly interact with the process fluid 7 within a large vessel 8.

Figure 2:
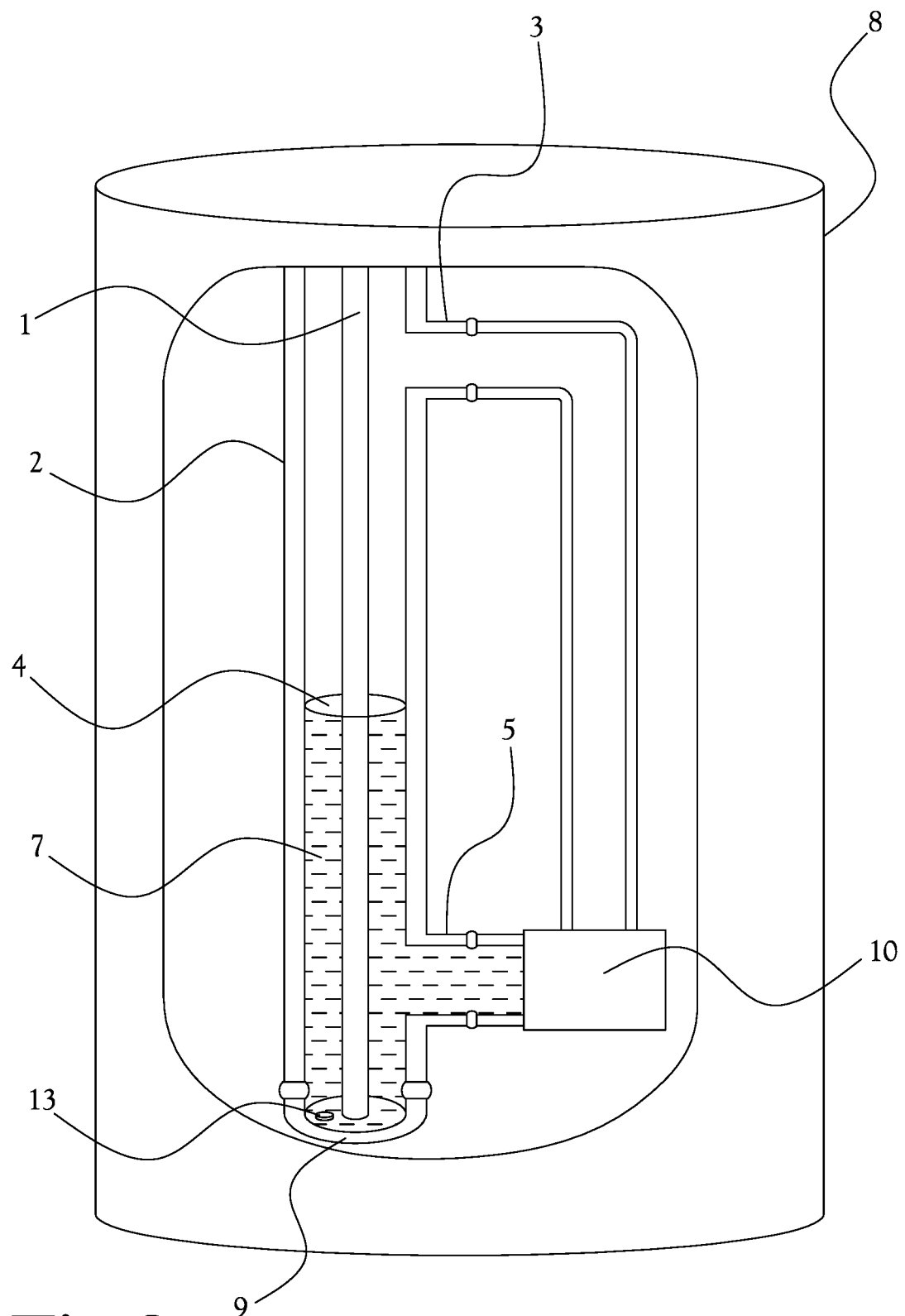
FIG. 2 is a simplified diagram of an assembly illustrating one possible configuration of the present invention for in-situ level sensor calibration that includes a sensor guide rod or probe installed within a capped chamber filled to some fluid level and a calibrated reference sensor such as a differential pressure sensor connected to the chamber via the upper and lower process penetrations.

FIG. 2 illustrates one possible configuration of the present invention for in-situ level sensor calibration that includes a sensor guide rod or probe 1 installed within a chamber 2 capped at the bottom 9 filled to some fluid level 4 and a calibrated reference sensor 10 such as a sight gauge or differential pressure sensor also connected to the chamber 2 with the high pressure input side of the reference sensor 10 connected to the lower penetration 5 below the fluid level 4 and the low pressure input side of the reference sensor 10 connected to the upper penetration 3 above the fluid level 4.

Figure 3:
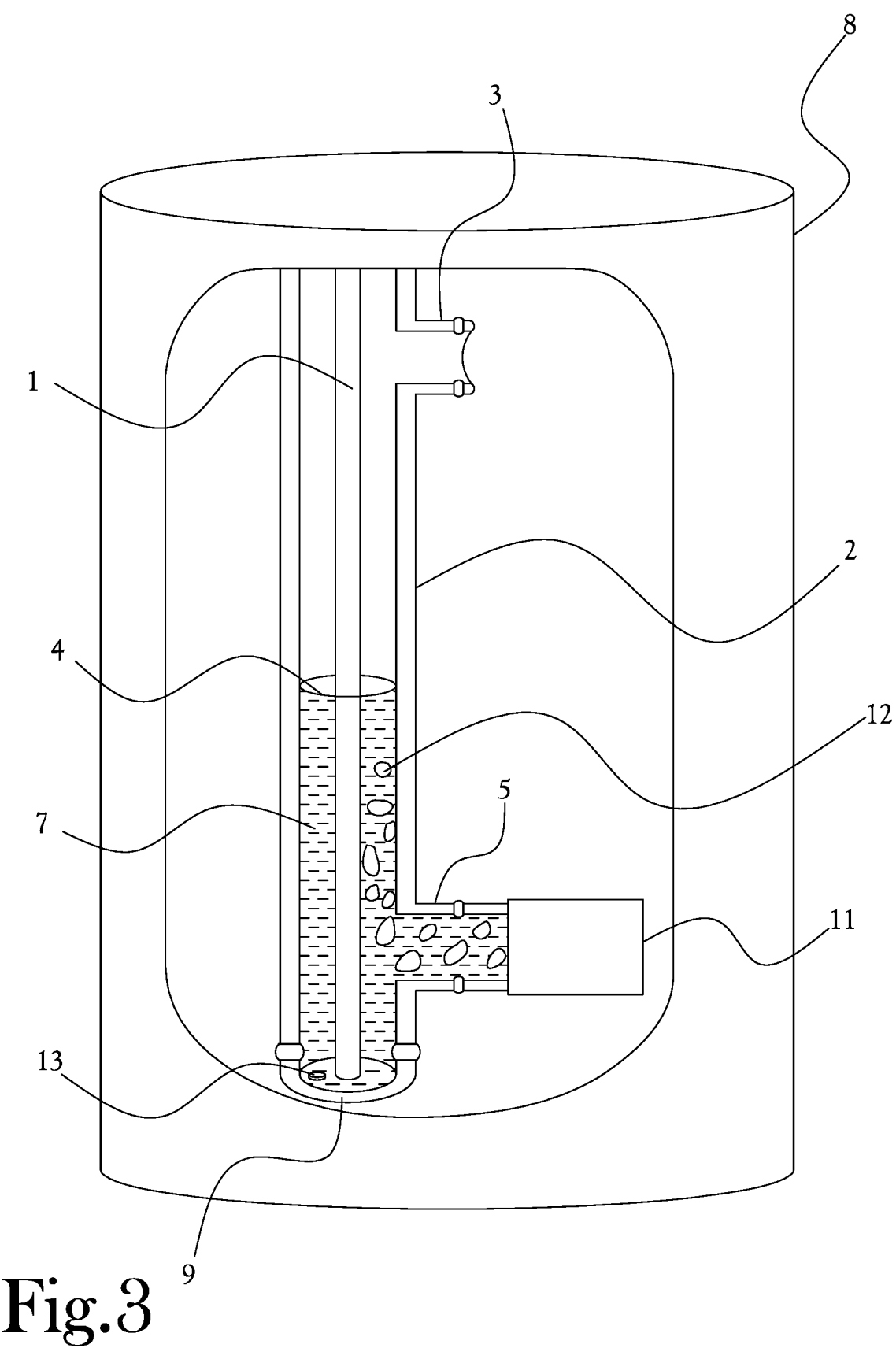
FIG. 3 is a simplified diagram of an assembly illustrating one possible configuration of the present invention for in-situ level sensor response time testing that includes a sensor guide rod or probe installed within a capped chamber filled to some fluid level and a random process noise generator connected to the lower process penetration to inject air pressure pulses into the fluid for response time testing using the noise analysis technique.

FIG. 3 illustrates one possible configuration of the present invention for in-situ level sensor response time testing that includes a sensor guide rod or probe 1 installed within a chamber 2 capped at the bottom 9 filled to some fluid level 4 and a random process noise generator 11 connected to the lower penetration 5 below the fluid level 4 to inject air pressure pulses 12 into the fluid 7 for response time testing using the noise analysis technique.

Figure 4:
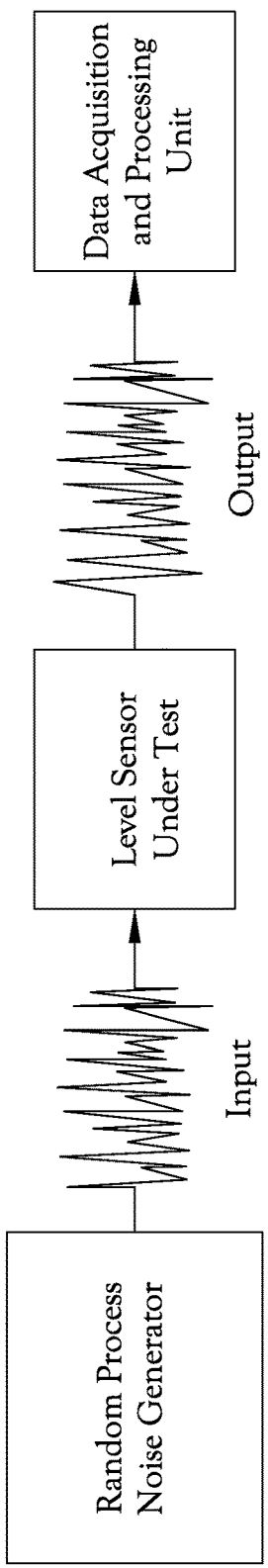
FIG. 4 is a block diagram of the components involved in a level sensor response time test approach using a noise analysis technique.
Figure 6:
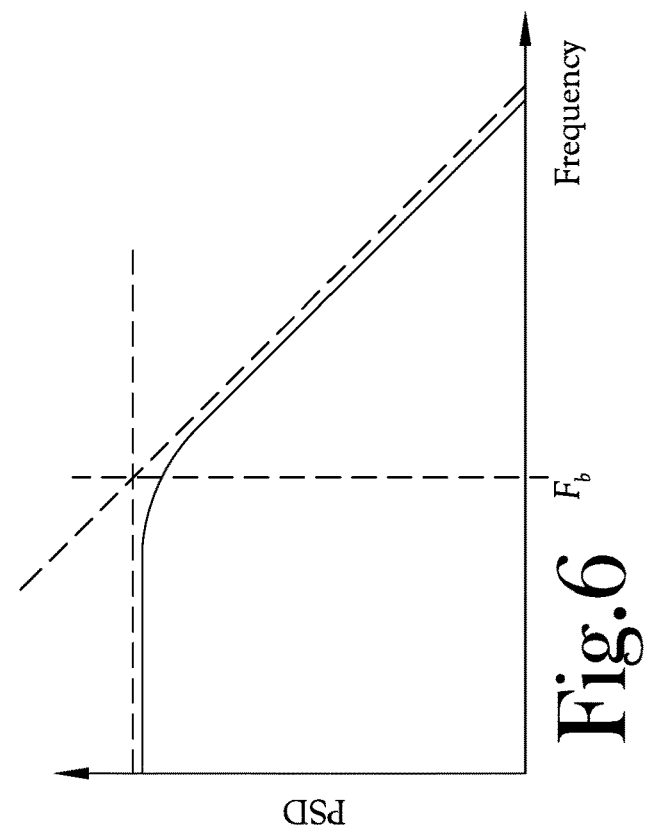
FIG. 6 is an illustration of a theoretical PSD curve with break frequency according to an example embodiment of a response time test approach for level sensors involving a noise analysis technique presented herein.
Figure 5:
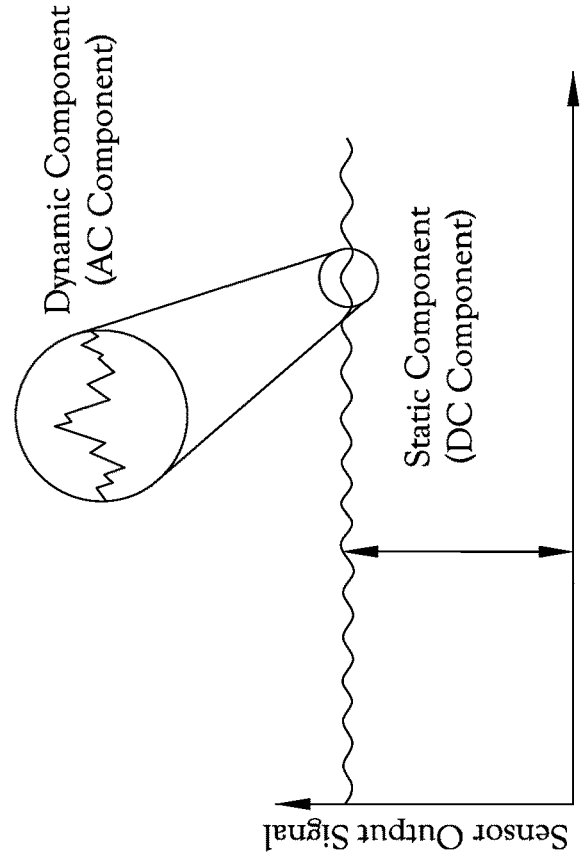
FIG. 5 is a representation of the output signal produced as a result of the input to the level sensor under test from a random process noise generator including a static component and a dynamic component which relates to the use of a noise analysis technique.

FIGS. 4 through 6 illustrates noise analysis. FIG. 4 is a block diagram of the components involved in a level sensor response time test approach using a noise analysis technique. A random process noise generator 11 provides air pressure pulses 12 to the fluid 7 which results in a dynamic input to the level sensor under test as illustrated in FIG. 3. The resulting sensor output signal may be sampled at a fast rate and analyzed in the time and/or frequency domain to determine sensor response time. FIG. 5 is a representation of the resulting sensor output signal when sampled at a fast rate by a data acquisition system. The sensor output signal may consist of a static component and a dynamic component which contains fluctuations or process noise important to the determination of sensor response time. The static component of the sensor output signal can be removed through the use of a high-pass filter or bias, leaving only the dynamic or noise component of the signal. The noise component can then be amplified and passed through a low-pass filter to eliminate undesirable high-frequency electrical noise from the signal. Once the signal has been properly conditioned as described, time and/or frequency domain noise analysis techniques may be implemented. FIG. 6 is an illustration of a theoretical PSD curve with break frequency according to an example embodiment of a response time test approach for level sensors involving a noise analysis technique presented herein. The PSD curve may be generated from the resulting sensor output signal sampled at a fast rate via FFT algorithms and identifying break frequency or fitting a mathematical function to the PSD may be used to determine the level sensor response time. For a simple first-order system, the break frequency identified from the PSD is all that is needed to determine sensor response time. The break frequency is the intersection of a line which forms the flat portion of the PSD curve with a line which follows the slope of the trailing portion. The simple representative PSD provided in FIG. 6 does not show any resonances or other process effects that may affect the response time determination.

Figure 7:
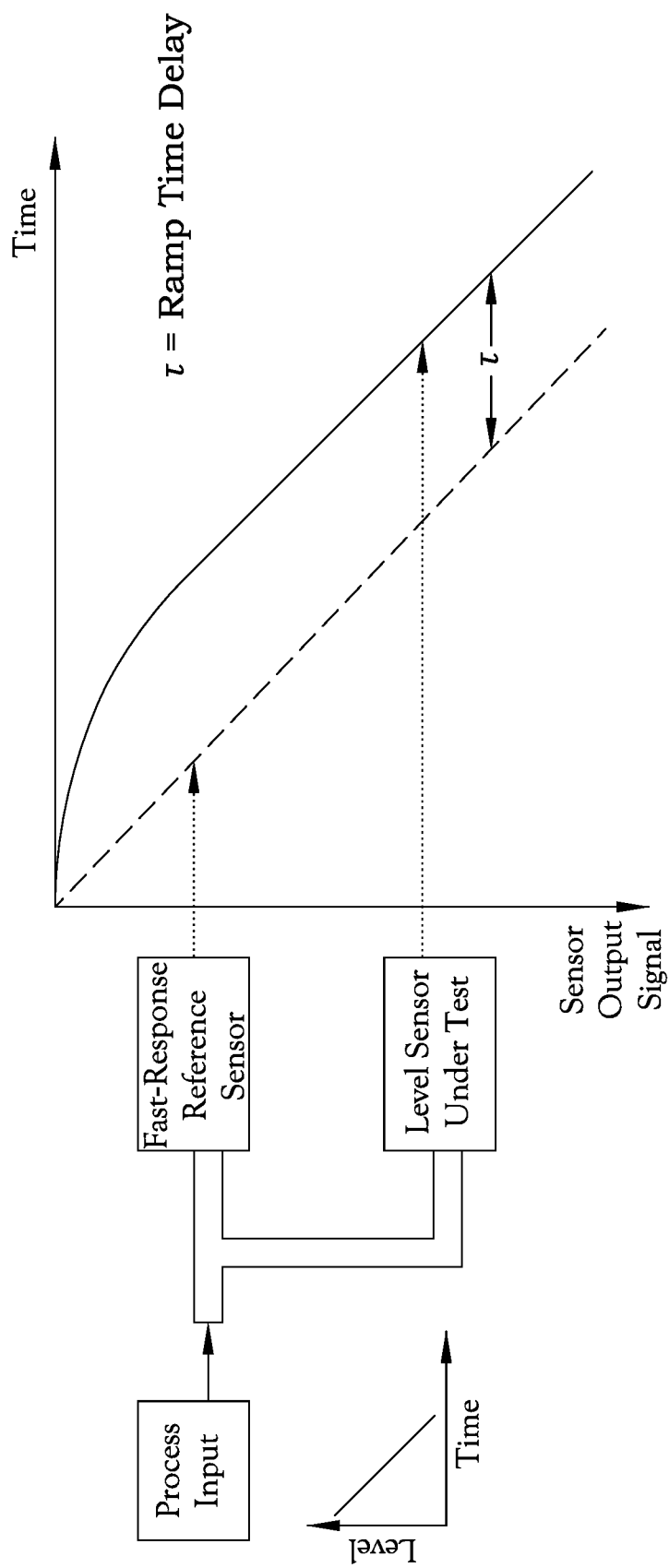
FIG. 7 is a representation of the output signals of the level sensor under test and a fast-response reference sensor produced as a result of a level ramp test in which the level is suddenly and quickly dropped.

FIG. 7 is a presentation of the output signals of the level sensor under test and a fast-response reference sensor produced as a result of a level ramp test in which the level is suddenly and quickly dropped. The response time for the level sensor under test is determined from the ramp time delay between the sensor under test and the reference sensor.

As illustrated and described herein, one possible configuration for in-situ level sensor calibration can involve capping the bottom of the chamber and connecting a calibrated reference sensor such as a differential pressure sensor or sight gauge to the upper and lower penetration ports. Sensor output data may be collected at several levels from the level sensor under test and from the calibrated reference sensor in order to verify calibration and/or re-calibrate the level sensor under test if necessary.

In some embodiments, in-situ response time testing can be achieved by capping the bottom of the chamber, filling the chamber to some level, and connecting a random process noise generator to the lower penetration port to provide random air pressure pulses for response time testing using the noise analysis technique. The noise analysis technique can be based on monitoring the fluctuations that exists at the output of a sensor while it is measuring a dynamic process. Data can be sampled from the sensor under test at a fast rate and analyzed in the time and/or frequency domain by generating a power spectral density (PSD) of the data via a Fast Fourier Transform (FFT) algorithm and fitting a mathematical function to the PSD to yield parameters that are used to determine sensor response time. The noise analysis technique can be used for determining the dynamic performance of differential pressure transmitters and other sensor systems in nuclear power plants, but it has also been used for response time testing of GWR and thermal dispersion based level sensors by the inventor.

According to the present invention, another possible configuration and approach for in-situ response time testing using the above-mentioned chamber involves capping the bottom of the chamber, fitting a fast-opening valve to the chamber bottom, filling the chamber to some level, and connecting a fast-response reference sensor such as a differential pressure transmitter to the upper and lower penetration points to perform a level ramp response test. Sensor output data may be collected from the level sensor under test and the fast-response reference sensor as the valve on the bottom of the chamber is suddenly opened and the level drops quickly. The response time for the level sensor under test is determined from the ramp time delay between the sensor under test and the reference sensor.

As described and illustrated herein, example embodiments of the present general inventive concept can be achieved by systems and methods of performing in-situ calibration and response time testing of level sensors. The system can include a chamber within which a level sensor guide rod or probe may be installed, including at least one upper penetration and one lower penetration to facilitate connection to test equipment. In-situ calibration verification may be accomplished by comparing the output of the sensor under test to that of a calibrated reference sensor that may be directly connected to the test chamber. In-situ response time testing may be accomplished by connecting a random process noise generator to the lower penetration, injecting air pressure pulses into the fluid that rise to the surface and cause the fluid level to fluctuate, and applying the noise analysis technique to the level sensor. Additionally, in-situ response time testing may be accomplished by connecting a fast-response reference sensor to the test chamber, opening a valve at the bottom of the chamber to drop the fluid level quickly, and comparing the resulting outputs of the level sensor under test to that of the fast-response reference sensor to identify the level sensor response time. The present innovative concept is applicable to a variety of level sensor technologies and is useful for in-situ calibration verification and response time testing in industrial applications including, but not limited to, nuclear power plants and small modular reactors.

As described herein, the systems, apparatus, methods, processes, control systems, functions, and/or operations and software for implementing the example embodiments of the present general inventive concept, for example the data acquisition and processing unit, may be wholly or partially implemented in the form of apparatus that includes processing elements and sets of executable instructions. The executable instructions may be part of one or more software applications and arranged into software architecture. In general, embodiments of the present general inventive concept may be implemented using a set of software instructions that are designed to be executed by a suitably programmed processing element (such as a CPU, GPU (graphics processing unit), microprocessor, processor, controller, computing device, etc.). In a complex application or system such instructions are typically arranged into "modules" with each such module typically performing a specific task, process, function, or operation. The entire set of modules may be controlled or coordinated in their operation by an operating system (OS) or other form of organizational platform.

The application modules may include any suitable computer executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. The computer-executable code or set of instructions may be stored in (or on) any suitable non-transitory computer-readable medium. In general, with regards to the embodiments described herein, a non-transitory computer-readable medium may include almost any structure, technology or method apart from a transitory waveform or similar medium.

As described, the data acquisition and processing systems, apparatus, methods, processes, functions, software and/or operations for implementing the example embodiments of the present general inventive concept may be wholly or partially implemented in the form of a set of instructions executed by one or more programmed computer processors such as a central processing unit (CPU) or microprocessor. Such processors may be incorporated in the circuitry and components of an apparatus, server, client or other computing or data processing device operated by, or in communication with, other components of the system.

It should be understood that the modules or operations of the present invention as described and illustrated herein can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes, modules, or functions described in this application may be implemented as software code to be executed by a processor using any suitable computer language such as, for example, Java, JavaScript, C++, LabVIEW, or Perl using, for example, conventional or object-oriented techniques. The software code may be stored as a series of instructions, or commands in (or on) a non-transitory computer-readable medium, such as a random-access memory (RAM), a read only memory (ROM), a magnetic medium such as a hard-drive or a floppy disk, or an optical medium such as a CD-ROM. In this context, a non-transitory computer-readable medium is almost any medium suitable for the storage of data or an instruction set aside from a transitory waveform. Any such computer readable medium may reside on or within a single computational apparatus, and may be present on or within different computational apparatuses within a system or network.

According to some example implementations, the term data acquisition and processing unit and/or the test equipment can be referred to as a control system, processing unit, or processor, as used herein, which may be a central processing unit (CPU), or conceptualized as a CPU (such as a virtual machine). In such example implementation, the CPU or a device in which the CPU is incorporated may be coupled, connected, and/or in communication with one or more peripheral devices such as, but not limited to, an electrochemical impedance spectroscopy (EIS) measuring unit, as well as one or more displays. In other example implementations, the processing unit or processor may be incorporated into a mobile computing device, such as a smartphone or tablet computer.

The non-transitory computer-readable storage medium referred to herein may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, synchronous dynamic random access memory (SDRAM), or similar devices or other forms of memories based on similar technologies. Such computer readable storage media allow the processing element or processor to access computer-executable process steps, application programs and the like, stored on removable and non-removable memory media, to off-load data from a device or to upload data to a device. As mentioned, with regards to the embodiments described herein, a non-transitory computer-readable medium may include almost any structure, technology or method apart from a transitory waveform or similar medium.

Certain implementations of the disclosed technology are described herein with reference to block diagrams of systems, and/or to configurations, functions, processes, or methods. It will be understood that one or more of the configurations, methods, processes, and functions can be implemented by computer-executable program instructions. Note that in some embodiments, one or more of the configurations, methods, processes, systems, and functions may not necessarily need to be performed in a particular order, or may not necessarily need to be performed at all.

These computer-executable program instructions may be loaded onto a general-purpose computer, a special purpose computer, a processor, or other programmable data processing apparatus to produce a specific example of a machine, such that the instructions that are executed by the computer, processor, or other programmable data processing apparatus create means for implementing one or more of the functions, operations, processes, systems, or methods described herein.

These computer program instructions may also be stored in a computer-readable memory that can direct a computer or other programmable data processing apparatus to function in a specific manner, such that the instructions stored in the computer-readable memory produce an article of manufacture including instruction means that implement one or more of the functions, operations, processes, or methods described herein.

Numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated.

It is noted that the simplified diagrams and drawings included in the present application do not illustrate all the various connections and assemblies of the various components, however, those skilled in the art will understand how to implement such connections and assemblies, based on the illustrated components, figures, and descriptions provided herein, using sound engineering judgment.

The invention claimed is:

1. A system for diagnosing performance of a level sensor of a fluid test chamber, comprising:
a data acquisition and processing unit configured to receive, record, and process output signals of one or more level sensors that are installed to a fluid chamber; and
a reference sensor installable to the fluid test chamber via at least one upper penetration and at least one lower penetration, wherein the data acquisition and processing unit is configured to record the output signals of the one or more level sensors and the reference sensor at one or more predetermined fluid levels of the fluid test chamber, and to compare the output signals to baseline data to quantify drift of the one or more sensors under test.

2. The system of claim 1, further comprising:
a sealable opening provided at a bottom of the fluid test chamber to enable the filling and draining of fluid within the fluid test chamber for level sensor calibration and/or response time testing.

3. The system of claim 1, wherein the fluid test chamber is installable to a process media vessel.

4. The system of claim 1, wherein the data acquisition and processing unit is configured to calibrate the one or more level sensors based on a comparison of the output signals to the baseline data.

5. The system of claim 1, further comprising a random process noise generator connectable to the at least one lower penetration to inject air pressure pulses into fluid contained in the fluid test chamber such that the air pressure pulses rise to the surface of the fluid to fluctuate the fluid level, wherein the data acquisition and processing unit is configured to record the output of the one or more level sensors while the fluid level is fluctuating, and to analyze resulting data in the time and/or frequency domain to determine response time of the one or more level sensors using one or more noise analysis techniques.

6. The system of claim 1, wherein the fluid test chamber includes a predetermined level of fluid, a valve provided at a bottom of the fluid test chamber, and a reference sensor connected to the upper and lower penetrations, wherein the data acquisition and processing unit is configured to record outputs of the one or more level sensors and the reference sensor as the valve is opened to rapidly drop the level of fluid within the fluid test chamber, and to compare resulting response data to identify a ramp time delay between the one or more level sensors and the reference sensor.

7. A method for in-situ calibration verification of one or more level sensors installable within a sealable test chamber, the test chamber comprising at least one upper penetration and at least one lower penetration, the method comprising:
connecting a calibrated reference sensor such as a differential pressure sensor or sight gauge to the test chamber via the at least one upper penetration and the at least one lower penetration;
filling the test chamber to one or more predetermined levels of fluid;
recording output signals of the one or more level sensors and the calibrated reference sensor; and
comparing the outputs signals to baseline data to quantity drift.

8. The method of claim 7, further comprising:
repeating the adjusting, recording, and comparing operations to recalibrate the one or more level sensors.

9. The method of claim 7, further comprising:
connecting a random process noise generator to the lower penetration to inject air pressure pulses into the fluid such that the air pressure pulses rise to the surface of the fluid to fluctuate the fluid level;
recording the output signals of the one or more level sensors while the fluid level is fluctuating; and
processing resulting data in the time and/or frequency domain to determine response time of the one or more level sensors using one or more noise analysis techniques.

10. The method of claim 7, wherein the sealable test chamber includes a fast-opening valve provided at a bottom of the test chamber, the method further comprising:
adjusting chamber fluid level to one or more predetermined levels;
connecting a reference sensor to the test chamber via the at least one upper penetration and the at least one lower penetration;
opening the valve to drop the chamber fluid level quickly;
recording the outputs of the one or more level sensors and the reference sensor; and
comparing the resulting response data to identify the ramp time delay between the one or more level sensors under test and the reference sensor.

11. The method of claim 10, wherein the reference sensor is a differential pressure sensor.

12. A system for diagnosing performance of a level sensor of a fluid test chamber, comprising:
a data acquisition and processing unit configured to receive, record, and process output signals of one or more level sensors that are installed to a fluid chamber; and
a random process noise generator connectable to a lower penetration to inject air pressure pulses into fluid contained in the fluid test chamber such that the air pressure pulses rise to the surface of the fluid to fluctuate the fluid level, wherein the data acquisition and processing unit is configured to record the output of the one or more level sensors while the fluid level is fluctuating, and to analyze resulting data in the time and/or frequency domain to determine response time of the one or more level sensors using one or more noise analysis techniques.

13. The system of claim 12, further comprising:
a sealable opening provided at a bottom of the fluid test chamber to enable the filling and draining of fluid within the fluid test chamber for level sensor calibration and/or response time testing.

14. The system of claim 12, wherein the fluid test chamber is installable to a process media vessel.

15. The system of claim 12, wherein the fluid test chamber includes a predetermined level of fluid, a valve provided at a bottom of the fluid test chamber, and a reference sensor connected to the upper penetration and a lower penetration, wherein the data acquisition and processing unit is configured to record outputs of the one or more level sensors and the reference sensor as the valve is opened to rapidly drop the level of fluid within the fluid test chamber, and to compare resulting response data to identify a ramp time delay between the one or more level sensors and the reference sensor.

16. A system for diagnosing performance of a level sensor of a fluid test chamber, comprising:
a data acquisition and processing unit configured to receive, record, and process output signals of one or more level sensors that are installed to a fluid chamber;

wherein the fluid test chamber includes a predetermined level of fluid, a valve provided at a bottom of the fluid test chamber, and a reference sensor connected to upper and lower penetrations, wherein the data acquisition and processing unit is configured to record outputs of the one or more level sensors and the reference sensor as the valve is opened to rapidly drop the level of fluid within the fluid test chamber, and to compare resulting response data to identify a ramp time delay between the one or more level sensors and the reference sensor.

17. The system of claim 16, further comprising:
a sealable opening provided at the bottom of the fluid test chamber to enable the filling and draining of fluid within the fluid test chamber for level sensor calibration and/or response time testing.

18. The system of claim 16, wherein the fluid test chamber is installable to a process media vessel.

19. The system of claim 16, further comprising a random process noise generator connectable to the lower penetration to inject air pressure pulses into fluid contained in the fluid test chamber such that the air pressure pulses rise to the surface of the fluid to fluctuate the fluid level, wherein the data acquisition and processing unit is configured to record the output of the one or more level sensors while the fluid level is fluctuating, and to analyze resulting data in the time and/or frequency domain to determine response time of the one or more level sensors using one or more noise analysis techniques.

* * * * *